United States Patent

Rahman et al.

[11] Patent Number: 5,565,496
[45] Date of Patent: Oct. 15, 1996

[54] SEPARATING METALS USING A MODIFIED DEIONIZING RESIN

[75] Inventors: M. Dalil Rahman, Flemington, N.J.; Philomen Z. deCroos, Coventry, R.I.

[73] Assignee: Hoechst Celanese Corporation, Somerville, N.J.

[21] Appl. No.: 156,182

[22] Filed: Nov. 22, 1993

[51] Int. Cl.$^6$ ............................ C08F 8/32; C08J 5/20
[52] U.S. Cl. ........................... 521/25; 521/30; 521/32; 525/348; 525/375; 525/384
[58] Field of Search ...................... 525/384, 348, 525/375; 521/32, 25, 30

[56] References Cited

U.S. PATENT DOCUMENTS

| | | | |
|---|---|---|---|
| 4,381,260 | 4/1983 | Chu | 534/726 |
| 4,423,158 | 12/1983 | Porath | 521/32 |
| 4,438,169 | 3/1984 | Daniels | 428/196 |
| 4,886,338 | 12/1989 | Yafuso | 350/96.29 |
| 5,141,966 | 8/1992 | Porath | 521/33 |

*Primary Examiner*—Fred Zitomer
*Attorney, Agent, or Firm*—Andrew F. Sayko, Jr.

[57] ABSTRACT

A process for producing a deionizing resin, which comprises reacting an organic compound having at least one reactive hydroxy group and at least one active chelating site with an organic polymer matrix having at least one reactive —OH or —NH$_2$ group, at a pH greater than 10.0 and thereby producing a polymer complex, washing the polymer complex with water followed by washing with a mineral acid solution and then again washing with water and thereby reducing the level of sodium, iron and chromium ions in the polymer complex to less than 500 ppb each.

16 Claims, No Drawings

SEPARATING METALS USING A MODIFIED DEIONIZING RESIN

BACKGROUND OF THE INVENTION

The present invention relates to a process for producing a deionizing resin by reacting with a fiber-forming organic compound having at least one reactive hydroxy group or amino group, an organic compound having at least one reactive hydroxy group and at least one active chelating site. Further, the present invention relates to a process for removing metals from such a deionizing resin and using it to remove metals from aqueous and non-aqueous systems.

The present invention relates to a process for producing a deionizing resin by reacting a polymeric organic compound having at least one reactive hydroxy group and at least one active chelating site, with a fiber-forming organic material having at least one reactive —OH or —NH$_2$ group, such as cellulose, rayon (regenerated cellulose), poly(vinyl alcohol), a copolymer of divinyl benzene and hydroxystyrene, poly(ethylene terephthalate), nylon 6 (polycaprolactam, nylon 66 (polyhexamethylene adipamide). The present invention further relates to a process for removing metals from such a deionizing resin by washing the reaction product with an acid, such as 1–25% mineral acid, and using it to remove metals from aqueous and non-aqueous systems, such as photoresists and components of photoresists.

Photoresist compositions are used in microlithorgraphy processes for making miniaturized electronic components such as in the fabrication of computer chips and integrated circuits. Generally, in these processes, a thin coating of film of a photoresist composition is first applied to a substrate material, such as silicon wafers used for making integrated circuits. The coated substrate is then baked to evaporate any solvent in the photoresist composition and to fix the coating onto the substrate. The baked coated surface of the substrate is next subjected to an image-wise exposure to radiation.

This radiation exposure causes a chemical transformation in the exposed areas of the coated surface. Visible light, ultraviolet (UV) light electron beam and X-ray radiant energy are radiation types commonly used today in microlithographic processes. After this image-wise exposure, the coated substrate is treated with a developer solution to dissolve and remove either the radiation-exposed or the unexposed areas of the coated surface of the substrate.

Metal contamination has been a problem for a long time in the fabrication of high density integrated circuits and computer chips, often leading to increased defects, yield losses, degradation and decreased performance. In plasma processes, metals such as sodium and iron, when they are present in photoresists, can cause contamination especially during plasma stripping. However, these problems have been overcome to a substantial extent during the fabrication process. For example, by utilizing HCl gettering of the contaminants during a high temperature anneal cycle.

As semiconductor devices have become more sophisticated, these problems have become much more difficult to overcome. When silicon wafers are coated with a liquid positive photoresist and subsequently stripped off, such as with oxygen microwave plasma, the performance and stability of the semiconductor device is often seen to decrease. As the plasma stripping process is repreated, more degradation of the device frequently occurs. A primary cause of such problems has been found to be the metal contamination in the photoresist, particularly sodium and iron ions. Metal levels of less than 1.0 ppm in the photoresist have been found to adversely affect the properties of such semiconductor devices.

SUMMARY OF THE INVENTION

The organic compounds of the present invention must have at least one active chelating site which can form chelates with metals such as Fe, Cu, Cr, Ni and other heavy metals and have at least one reactive hydroxy group. The deionizing resin must be insoluble in the solvent for the product being deionized. Therefore, when an aqueous or non-aqueous solution contaminated with metals is passed through this insoluble polymer matrix, chelates form and metals are separated from the solution being deionized. In the process for producing the deionizing resin, the pH is preferably maintained at greater than about 10.0, preferably from about 10.0 to 13.0, most preferably from about 11.0 to 13.0.

The present invention provides a process for producing deionizing resin to remove metals, particularly heavy metals, from aqueous and non-aqueous solutions. The process utilizes an organic compound having at least one reactive hydroxy group and at least one active chelating site anchored within an appropriate organic polymer matrix, to purify aqueous and non-aqueous solutions. The subject process comprises reacting the organic compound with an appropriate organic polymer matrix, preferably at a pH greater than 10.0, more preferably in the presence of a base, such as a solution of sodium hydroxide and sodium chloride, to produce a polymer complex, then washing the reaction product with water, preferably deionized (DI) water, followed by washing with a mineral acid solution (e.g. a 1–25% solution of sulfuric, nitric or hydrochloric acid) and then again washing with water to thereby reduce the level of sodium, iron, chromium and other metals ions in the reaction product to less than 500 ppb each, preferably less than 200 ppb each, more preferably less than 100 ppb each, and most preferably no more than 40 ppb each.

DETAILED DESCRIPTION OF THE PREFERRED EMBODIMENT

Organic compounds, which are metallized dyes, non-metallized dyes or dye intermediates are preferably used.

One such preferred compound is a dyestuff which is coordinated either di- or tri-cyclically to a formazane compound and which correspond to the general formula I:

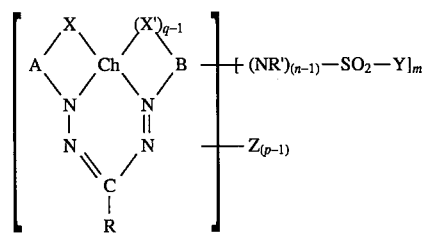

In this formula I:

A and B each represent an aromatic carbocycle or one represents an aromatic carbocycle and the other represents an aromatic heterocycle containing X or X' in o-position to the nitrogen bond;

X and X' each represents a metal bonding substitutent, such as N, S, or O;

Ch represents a chelating site to which a heavy metal can be bound;

m, n, q, each represents a whole number of 2 or less;
p represents a whole number ranging from 1 to 5;
R represents hydrogen or a monovalent organic group;
R' represents hydrogen or a low unsubstituted or substituted ($C_1$–$C_6$) alkyl group.

The monovalent organic group of R may be an aromatic or heterocyclic-aromatic group, particularly an optionally ring-substituted phenyl group, or a group of the naphthalene series, or it is a 5- or 6-membered heterocyclic-aromatic group, particularly such a group having 1 to 2 hetero atoms such as O, S or N, e.g. a group of furan, thiophene, pyrrole, imidazole, pyrazole, pyridine, pyrimidine, quinoline or benzimidazole. Aryl components of R can contain the ring substitutents usual in azo dyestuffs.

As unsubstituted or substituted lower alkyl group which can contain up to 6 carbon atoms, R' represents, e.g. the methyl, ethyl, isopropyl, t-butyl, β-chloroethyl, β-cyanoethyl, β-carboxyethyl or β-carboethozyethyl group. Preferably, however, R' is hydrogen.

Lower alkyl groups having 1 to 4 carbon atoms, such as the methyl or ethyl group are meant by alkyl substitutent in Y; as aryl substitutents in Y, particularly the phenyl or an alkylphenyl or halogenophenyl group are meant.

Z represents a salt-forming, water-solubilising group which can dissociate in water with the release of protons, such as phosphonic acid groups, carboxyl groups, disulphimide groups and/or sulphonic acid groups, the latter being preferred. Different groups Z can also have several of these groups in the same molecule.

In addition to the substitutents above mentioned, the groups A, B and R can contain other substitutents usual in azo dyestuffs. As ring substitutents there can be mentioned e.g.: halogen such as fluorine, chlorine or bromine; alkyl groups such as methyl, ethyl, isopropyl, t-butyl, t-amyl or di-isobutyl groups; substituted alkyl groups, e.g. perfluoroalkyl groups such as the trifluoromethyl group; also alkoxyalkyl, acyloxy-alkyl, cyanoalkyl, carboxyalkyl groups, these latter groups being preferably N-substituents; alkenyl groups such as the vinyl group; ether groups, preferably lower alkoxy or aryloxy groups such as methoxy, ethoxy, propoxy, butoxy or phenoxy groups, thioether groups such as phenylthio groups; arylsulphonyloxy groups; alkylsulphonyl and arylsulphonyl groups; acyl groups; sulphonic acid amido or carboxylic acid amido groups containing a primary, secondary or tertiary amide moiety and aliphatic, araliphatic, alicyclic, aromatic-carbocyclic or aromaticheterocyclic N-substitutents; nitro groups; cyano groups; primary secondary or tertiary amino groups; acylamido groups such as acetyl-, chloroacetyl-, bromopropionyl-, chloroacryloyl-, bromoacryloyl-, benzoyl, methylsulphonyl-, ethylsulphonyl-, chloromethylsulphonyl-, benzene sulphonyl- and methylbenzene sulphonyl-amido groups. All carbocyclic aryl components of these substituents can also be so substituted.

Another such preferred organic compound is a formazane which corresponds to the general formula II:

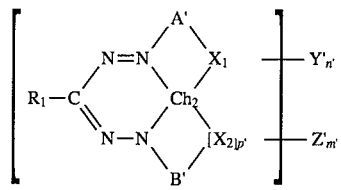

In this formula II:

$R_1$ represents a monovalent group, in particular a monovalent aromatic group;

A' and B' each represent the group of an aromatic diazo component which contains $X_1$ or $X_2$ in a position vicinal to the azo linkage;

$X_1$ and $X_2$ each represents a metal binding substitutent, preferably an oxy, carboxy or sulphonylamide group;

Y' represents a salt-forming, water solubilizing group which dissociates strongly in water with the release of protons, preferably the sulphonic acid group;

Z' represents an amido group derived from an acylatable group, preferably a primary amino group, the acyl group of which contains at least one mobile substituent which reacts with alkalies while splitting off an anion. The acyl group of the amido group consists of, e.g. the group of a β-halogen fatty acid or preferably the group of a cyclic carbimide halide which also contains at least one halogen atom at a ring carbon atom vicinal to a tertiary ring nitrogen atom; it consists in particular of an azine ring of aromatic character having at least 2 tertiary ring nitrogen atoms, which azine ring contains at least one halogen atom of the atomic numbers 17–35 at ring carbon atoms vicinal to such ring nitrogen atoms, $Ch_2$ represents a a chelating site to which a heavy metal can be bound;

n' represents a positive whole number from 1–5, preferably 2–4;

m' represents a positive whole number of at most 2;

p' represents 0 or 1.

Among the most preferred organic compounds are those which correspond to formulas III, IV, V, VI, VII and VIII below:

III

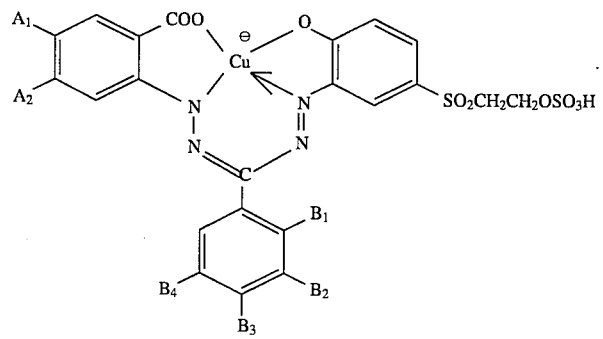

-continued
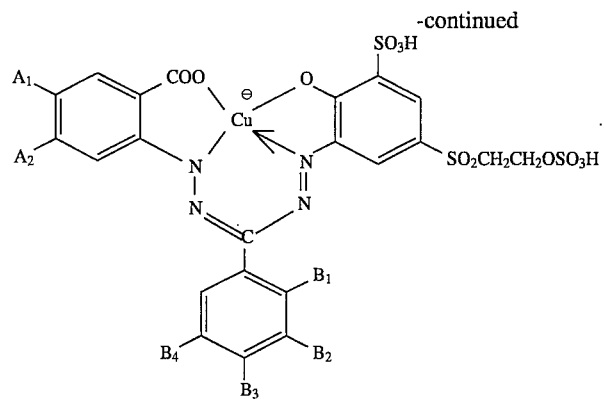 IV
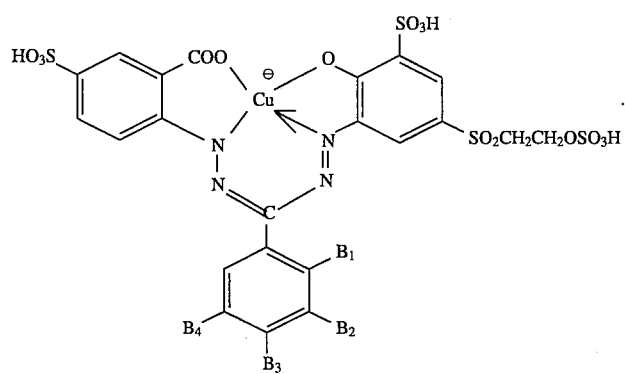 V
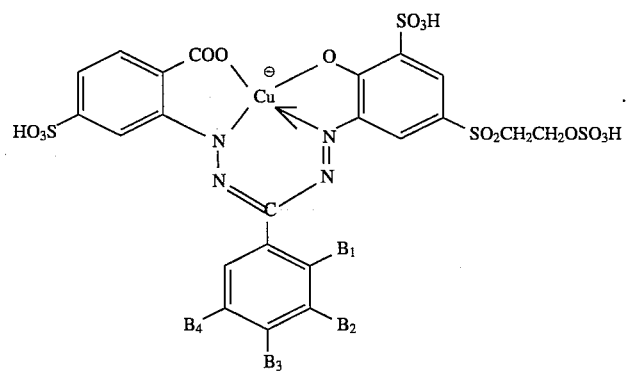 VI
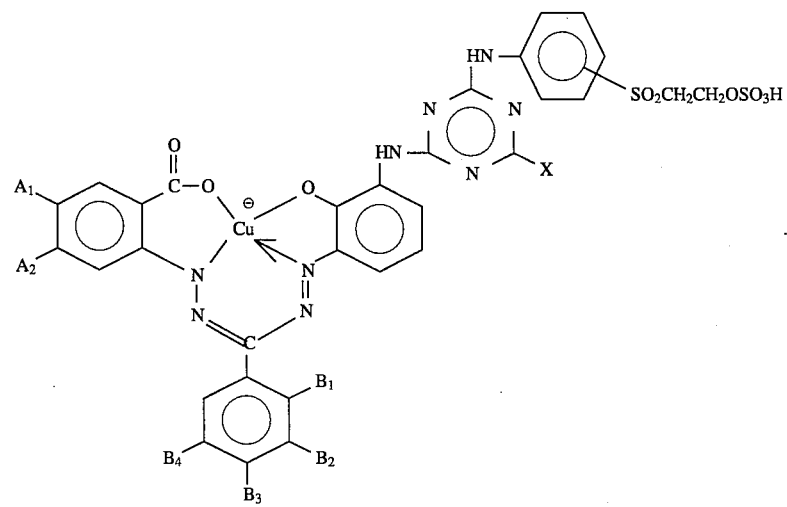 VII

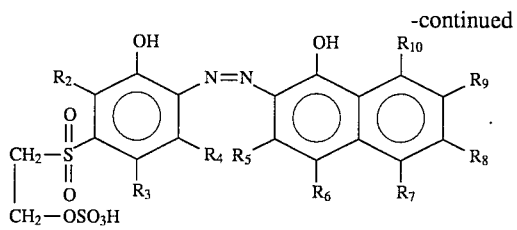

VIII wherein in Formulas III, IV, V and VI:

$A_1$ and $A_2$ can be —$SO_3H$, —OH, —H, —Cl or —$NO_2$;

$B_1$, $B_2$, $B_3$ and $B_4$ can be —$SO_3H$, —H, Cl or —$NO_2$, with at least one of $A_1$, $A_2$, $B_1$, $B_2$, $B_3$ and $B_4$ being —$SO_3H$;

$R_2$–$R_{10}$ can be —$SO_3H$, —H, —$NH_2$ or —$OCH_3$.

The organic compound is reacted with an appropriate fiber-forming organic material having at least one reactive —OH or —$NH_2$ group, including polysaccharides (such as cellulose), rayon, vinyl polymers such as poly(vinyl alcohol) or a copolymer of divinyl benzene and hydroxypolystyrene, poly(ethylene terephthalate), nylon 6 and nylon 66 to produce the polymer complex.

The deionizing resin can be used in a column, a cartridge filter, a bag filter, a depth filter, an absolute filter of any practical pore size or a membrane filter.

Before being utilized in the process of the present invention, the deionizing resin must first be rinsed with water and then a mineral acid solution and, preferably again with water, to substantially reduce the metal ion level. Most preferably the deionizing resin is initially rinsed with DI water, followed by washing with a mineral acid solution preferably a 1–25% by weight solution, such as a sulfuric acid, nitric acid or hydrochloric acid solution, rinsed again with deionized water, treated again with the mineral acid solution and once again rinsed with DI water. Before purifying any component or admixture in an organic solvent, it is critical that the deionizing resin is first rinsed with a solvent which is the same as, or at least compatible with, the concerned composition solvent, to remove substantially all of the water from the deionizing resin, unless the product to be deionized is dissolved in water. In this case the deionizing resin has already been rinsed with water.

The following specific examples will provide detailed illustrations of the methods of producing and utilizing compositions of the present invention. These examples are not intended, however, to limit or restrict the scope of the invention in any way and should not be construed as providing conditions, parameters or values which must be utilized exclusively in order to practice the present invention.

EXAMPLE 1

20 g powdered (Ramazol Blue BB dye: <2-{y-[2-hydroxy-5-(hydroxysulfonyloxy ethylsulfonyl)- 3-sulfonatophenylazo]-benzylidenehydrazino}-4-sulfonato-benzoato-01,02,N1,N2>-cuprate(4-)tetrasodium salt) was dissolved in 1.5 liters water, heated to 40° C., 5 g of 50% NaOH solution was added to adjust the pH to between 11 and 12. To this solution 200 g solka floc (cellulose) was added in portion. The slurry was heated for 2 hours at 60° C. The slurry was then filtered and washed with DI water to remove all unreacted dye. It was thoroughly washed with 10% sulfuric acid solution to remove metals. The cellulose dye complex slurry in DI water was charged into a glass column. The column bed was washed with 10% HCl solution (6 bed volumes) and then with DI water until the effluent was neutral and metals free (conductivity 18 mega ohm). A standard solution of ferric chloride (910 ppm Fe) was passed through the column. The effluent was collected and tested for Fe. The Fe level was found to be less than 50 ppb.

EXAMPLE 2

The experiment in example 1 was repeated and a Cr $Cl_3$ solution (chromium 10 ppm) was passed through the column, as in example 1. The chromium level was reduced to 900 ppb.

EXAMPLE 3

To 1500 ml. DI water, 100 g polyvinyl alcohol was added and heated to 55° C. 25 g of Ramazol (PZ88 dye (available from Hoechst Celanese Corporation) was added. 30 g of sodium carbonate was added over 15 minutes, with stirring. 500 ml. of a saturated sodium chloride water solution was added and reaction was allowed to go for half an hour. The reaction product was filtered and washed with DI water, until all the unreacted dye is removed. The reaction product was washed with 10% HCl solution 2 times, followed by washing with DI water to remove metals and hydrochloric acid. Dyed polyvinyl alcohol was dried under vacuum. A slurry was made with dyed polyvinyl alcohol in water and poured into a glass column. Water was removed by passing electronic grade acetone, followed by cellusolve acetate (CA) to remove acetone. A 25% novolak resin solution in CA was passed through the column at the rate of 8 minutes total residence time. The untreated and treated materials were tested for metals. The result of the test are shown below:

| Metal | Untreated Sample (ppb) | Treated Sample (ppb) |
| --- | --- | --- |
| Na | 256 | 211 |
| Fe | 55 | 53 |
| Cr | 1353 | 201 |
| Cu | 6 | 6 |
| Pb | 8 | <5 |
| Mg | <5 | <5 |
| Zn | 50 | 37 |

EXAMPLE 4

A dyed solka floc was made according to the procedure example 1 using Ramazol PZ88 dye. After washing with 10% HCl solution and DI water, it was dried in a vacuum oven at 45° C. A slurry was made using the dyed solka floc (40 g) and novolak solution in Cellosolve Acetate (CA) (200 g, 25%). This slurry was charged into a filter housing equiped with a screen and 1 gm filter pad. The material was allowed to pass by nitrogen pressure. When a bed of dyed solka floc formed in the filter housing, the novolak solution was recycled through this bed 3 times. The treated and untreated materials were tested for metals. The result were as follows:

| Metals | Untreated (ppb) | Treated (ppb) |
|---|---|---|
| Na | 256 | 55 |
| Fe | 55 | 9 |
| Cr | 1353 | 129 |
| Cu | 6 | <5 |
| Pb | 8 | <5 |
| Mg | <5 | <5 |
| Zn | 50 | 22 |

We claim:

1. A process for producing a deionizing resin, which comprises reacting an organic compound having at least one hydroxy group and at least one chelating site with an organic polymer matrix having at least one —OH or —$NH_2$ group, at a pH greater than 10.0 and thereby producing a polymer complex, washing the polymer complex with water followed by washing with a mineral acid solution and then again washing with water and thereby reducing the level of sodium, iron and chromium ions in the polymer complex to less than 100 ppb each.

2. The process of claim 1, wherein the organic compound is an intermediate used to a metallized dye.

3. The process of claim 1, wherein the organic compound is a dyestuff which is coordinated either di- or tri-cyclically to a formazane compounds and which correspond to the formula:

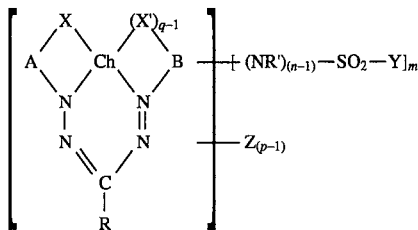

wherein:

A and B each represent an aromatic carbocycle or one represents an aromatic carbocycle and the other represents an aromatic heterocycle containing X or X' in o-position to the nitrogen bond;

X and X' each represents a metal bonding substitutent, selected from N, S, or O;

Ch represents a chelating site to which a heavy metal can be bound;

m,n,q, each represents a whole number of 2 or less;

p represents a whole number ranging from 1 to 5;

R represents hydrogen or a monovalent organic group;

R' represents hydrogen or a low unsubstituted or substituted ($C_1$–$C_6$) alkyl group;

y represents a lower alkyl group having 1 to 4 carbon atoms or a phenyl, lower alkyl group phenyl or halogenophenyl;

Z represents a salt-forming, water solubilizing group which can dissociate in water with the release of protons.

4. The process of claim 3, wherein the monovalent organic group of R is an aromatic or heterocyclic-aromatic group selected from an optionally ring-substituted phenyl group, a group of the naphthalene series or is a 5- or 6-membered heterocyclic-aromatic group.

5. The process of claim 4, wherein the heterocyclic aromatic group has 1 to 2 hetero atoms selected from O, S or N.

6. The process of claim 5, wherein the heterocyclic aromatic group is a furan, thiophene, pyrrole, imidazole, pyrazole, pyridine, pyrimidine, quinoline or benzimidazole.

7. The process of claim 1, wherein R' is hydrogen, methyl, ethyl, isopropyl, t-butyl, β-chloroethyl, β-cyanoethyl, β-carboxyethyl or β-carboethozyethyl.

8. The process of claim 1, wherein y is a methyl or ethyl group.

9. The process of claim 1, wherein the organic compound is a formazane which corresponds to the formula:

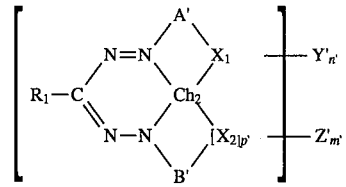

wherein:

$R_1$ represents a monovalent group;

A' and B' each represent the group of an aromatic diazo component which contains $X_1$ or $X_2$ in a position vicinal to the azo linkage;

$X_1$ and $X_2$ each represents a metal binding substitutent;

Y' represents a salt-forming, water solubilizing group which dissociates in water with the release of protons;

Z' represents an amido group derived from an acylable group, the acyl group of which contains at least one mobile substituent which reacts with alkalies while splitting off an anion;

$Ch_2$ represents a a a chelating site to which a heavy metal can be bound;

n' represents a positive whole number from 1–5;

m' represents a positive whole number of at most 2;

p' represents 0 or 1.

10. The process of claim 1, wherein the organic compound corresponds to the formula:

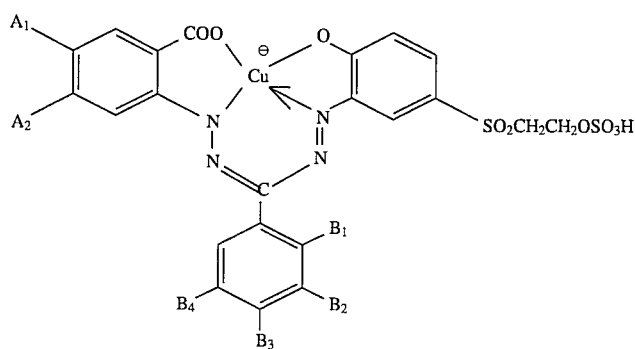

wherein $A_1$ and $A_2$ can be —$SO_3H$, —OH, —H, —Cl or —$NO_2$;

$B_1$, $B_2$, $B_3$ and $B_4$ can be —$SO_3H$, —H, Cl or —$NO_2$, with at least one of $A_1$, $A_2$, $B_1$, $B_2$, $B_3$ and $B_4$ being —$SO_3H$.

11. The process of claim 1, wherein the organic compound corresponds to the following formula:

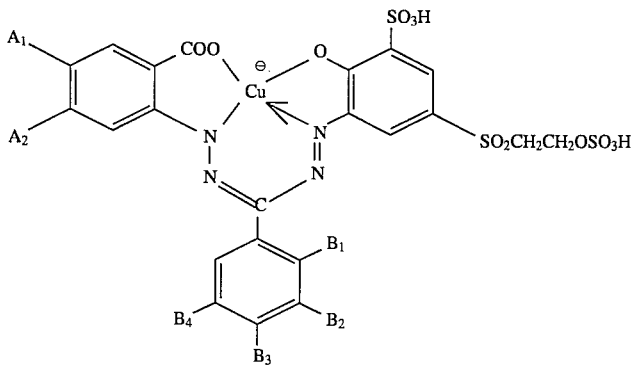

wherein $A_1$ and $A_2$ is —$SO_3H$, —OH, —H, —Cl or —$NO_2$;

$B_1$, $B_2$, $B_3$ and $B_4$ is —$SO_3H$, —H, Cl or —$NO_2$, with at least one of $A_1$, $A_2$, $B_1$, $B_2$, and $B_3$ being —$SO_3H$;

12. A process for producing a deionizing resin, which comprises reacting an organic compound corresponding to the following formula:

$B_1$, $B_2$, $B_3$ and $B_4$ is —$SO_3H$, —H, Cl or —$NO_2$ with an organic polymer matrix having at least one —OH or —$NH_2$ group, at a pH greater than 10.0 and thereby producing a polymer complex, washing the polymer complex with water followed by washing with a mineral acid solution and then again washing with water and thereby reducing the level of sodium, iron and chromium ions in the polymer complex to less than 100 ppb each.

13. A process for producing a deionizing resin, which comprises reacting an organic compound coresponding to the formula:

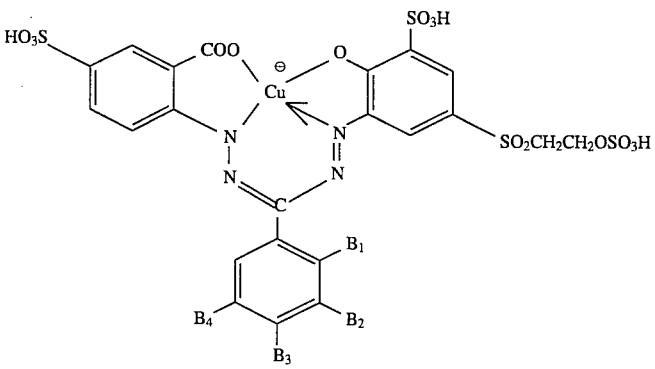

wherein

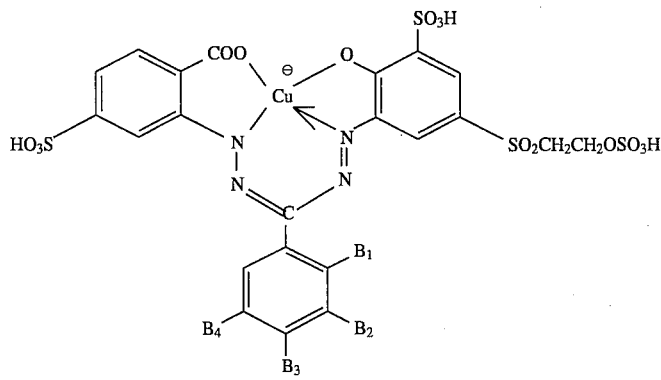

wherein $B_1$, $B_2$, $B_3$ and $B_4$ is —$SO_3H$, —H, Cl or —$NO_2$, with an organic polymer matrix having at least one —OH or —$NH_2$ group, at a pH greater than 10.0 and thereby producing a polymer complex, washing the polymer complex with water followed by washing with a mineral acid solution and then again washing with water and thereby reducing the level of sodium, iron and chromium ions in the polymer complex to less than 100 ppb each.

14. The process of claim 1, wherein the organic compound is reacted with a fiber-forming organic material having at least one —OH or —$NH_2$ group.

15. The process of claim 14, wherein the fiber-forming organic material is a polysaccharide, rayon, a vinyl polymer, poly(ethylene terephthalate), nylon 6 or nylon 66.

16. The process of claim 1, wherein the organic compound corresponds to the formula:

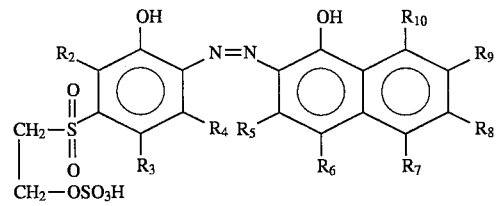

wherein $R_2$–$R_{10}$ is —$SO_3H$, —H, —$NH_2$ or —$OCH_2$.

* * * * *